United States Patent [19]

Damouth et al.

[11] 4,160,939
[45] Jul. 10, 1979

[54] MOTOR SPEED CONTROL SYSTEM

[75] Inventors: David E. Damouth, Rochester, N.Y.; William F. Gunning, Los Altos Hills, Calif.

[73] Assignee: Xerox Corporation, Stamford, Conn.

[21] Appl. No.: 832,776

[22] Filed: Sep. 13, 1977

[51] Int. Cl.² .............................................. H02P 5/34
[52] U.S. Cl. ................................... 318/723; 318/313; 356/398
[58] Field of Search ............... 318/171, 174, 175, 176, 318/313, 312, 311, 627, 701, 702, 721, 723; 356/167, 120, 4; 250/236

[56] References Cited

U.S. PATENT DOCUMENTS

| | | | |
|---|---|---|---|
| 3,609,488 | 3/1970 | Sampson et al. | 318/171 |
| 3,692,414 | 9/1972 | Hosterman et al. | 356/167 |

Primary Examiner—Gene Z. Rubinson
Attorney, Agent, or Firm—Irving Keschner; Barry P. Smith

[57] ABSTRACT

A motor speed control system for reducing instantaneous speed variations as a result of hunting in hysteresis synchronous motors utilized to drive optical scanners by controlling the frequency of the drive signal applied to the motor. A laser beam is reflected from the facets of the optical scanner and scans a surface along a scan line, a signal being generated at the start and end of each scan line. A counter is driven by an accurate clock which is started and stopped in accordance with the start and end of scan signals. The resulting count of the counter is thus inversely proportional to the speed of the motor and is converted to an analog input signal and coupled to a voltage controlled oscillator whose frequency is controlled for driving the motor such that undesirable oscillations of the motor are damped out. Additional embodiments for controlling the motor speed are disclosed which utilize only the start of scan signal to both start and stop the counter.

10 Claims, 5 Drawing Figures

MOTOR SPEED CONTROL SYSTEM

BACKGROUND OF THE INVENTION

The use of a laser beam for scanning an original and/or recording information on a laser sensitive medium has been disclosed in the prior art as shown, for example, in U.S. Pat. No. 3,946,150. For recording purposes, a laser beam is directed to a modulator which modulates the laser beam in accordance with information to be printed on the laser sensitive medium, such as a charged xerographic surface. The modulator beam is directed to a rotating optical scanner, driven by a motor, which acts to scan the beam across the xerographic surface.

While for relatively low-accuracy requirements the motor driving the rotating scanner can be made to function adequately without speed sensing and feedback control, this generally can only be accomplished by careful and perhaps expensive attention to the elimination of all sources of disturbances of the motor.

It has been found that for accurate speed control at relatively high speeds a hysteresis synchronous motor would be preferable to drive the rotating scanner. However, these motors tend to exhibit characteristic speed variations called "hunting" which is a rotational oscillation about its equilibrium or steady state velocity and which will have adverse effects in scanning systems which use hysteresis synchronous motors. The angle between the mechanical position of the motor rotor and the electrical position of the rotating electric field constitutes a phase lag. A disturbance to the motor shaft can cause hunting because the lag angle is oscillating about its steady state value. If the drag (damping) component of the motor load could be accurately controlled so as to provide critical damping or slight overdamping no oscillation would occur. However, sources of friction are difficult to control and may slow the initial acceleration of the motor and even cause the motor to run below its synchronous speed. Hunting is a short term speed variation of the motor, wherein the average speed remains constant and the instantaneous speed undergoes periodic excursions above and below the average. Thus, an alternative is to provide a speed control system whose response time is rapid enough to control these short term variations without reducing the available motor torque or acceleration.

The prior art discloses various systems for controlling a synchronous motor in a manner to eliminate or substantially reduce the huntingcharacteristic. For example, in U.S. Pat. No. 3,609,488 a motor speed control system is disclosed. However, the system disclosed therein does not provide the precise speed control desired in high resolution and close registration tolerance optical scanning systems. Copending application Ser. No. 756,511 filed Jan. 3, 1977 and assigned to the assignee of the present invention, discloses a precise speed control system for controlling a synchronous motor used to drive an optical scanner motor. In this copending application the amplitude of the signals utilized to drive the motor field windings are modulated in a manner such that the motor torque is adjusted in response to the modulated drive signal such that hunting in the motor is damped out. Although the system described in the aforementioned copending application is an effective way of damping motor hunting, alternate motor speed control techniques for damping motor hunting would be desirable.

SUMMARY OF THE PRESENT INVENTION

The present invention provides a motor speed control system for reducing instantaneous speed variations as a result of hunting in hysteresis synchronous motors utilized to drive optical scanners by controlling the frequency of the voltage applied to the motor windings. A laser beam is reflected from the facets of the optical scanner and scans a surface along a scan line, a signal being generated, in one embodiment, at the start of and end of each scan line. A counter is driven by an accurate clock which is started and stopped in accordance with the start and end of scan signals. The resulting count of the counter is thus inversely proportional to the speed of the motor and is converted to an analog input signal and coupled to a voltage controlled oscillator whose frequency is controlled for driving the motor such that undesirable oscillations of the motor are damped out. Additional embodiments are disclosed for controlling the motor speed which utilize only the start of scanning signal to both start and stop the counter.

It is an object of the present invention to provide a control system for controlling the speed of a synchronous motor.

It is a further object of the present invention to provide a control system for precisely controlling the speed of a synchronous motor, the motor driving an optical scanner.

It is still a further object of the present invention to provide a speed control system for reducing the speed variations of a hysteresis synchronous motor due to its hunting characteristic by varying the frequency of the motor drive signal without reducing the available torque and acceleration.

It is an object of the present invention to provide a control system for precisely controlling the speed of a synchronous motor, the motor driving an optical scanner utilized in laser scanning applications.

BRIEF DESCRIPTION OF THE DRAWINGS

For a better understanding of the invention as well as other objects and further features thereof, reference is made to the following description which is to be read in conjunction with the following drawings wherein.

DESCRIPTION OF THE PREFERRED EMBODIMENTS

Figure 1:
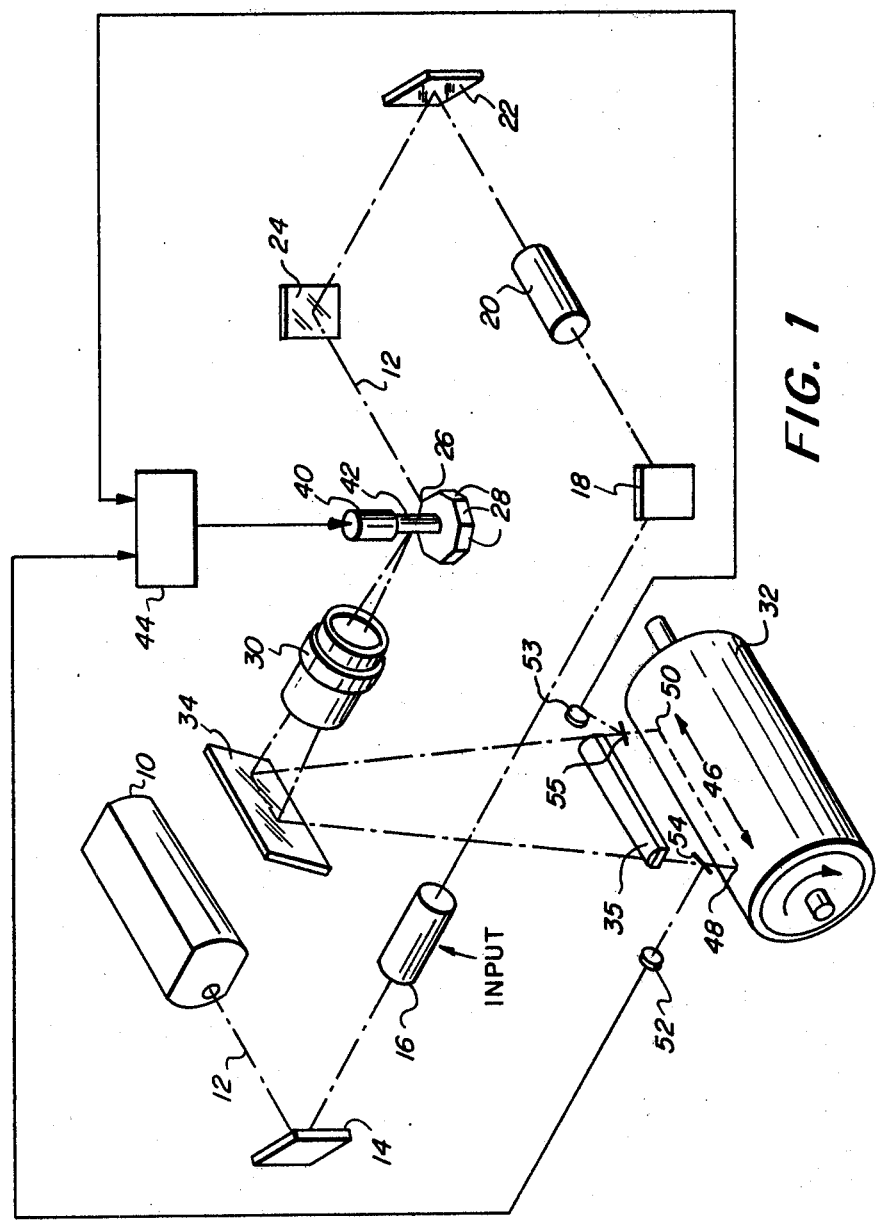
FIG. 1 is an isometric illustration of a scanning system in which the present invention can be utilized.

In FIG. 1, an embodiment of a scanning system in which the present invention can be utilized is shown. Although the scanning system shown is utilized to record (write) information on a medium, it could also be utilized to scan (read) an original document if desired. A flux source 10 provides the beam of flux for utilization by the scanning system. The flux source 10 is preferably a laser which generates a collimated beam 12 of monochromatic radiation which is reflected by a mirror 14 to be modulated by modulator 16 in conformance with the information contained in an electrical signal.

Modulator 16 may be any suitable electro-optical or acousto-optical modulator for imparting the information to the beam 12. The modulator 16 may be, for example, a Pockels cell comprising a potassium dihydrogen phosphate crystal, whose index of refraction is periodically varied by the application of the varying voltage which represents the electrical signal. The signal in turn may correspond to an image scanned on an input document, it being desired to reproduce the image on a laser sensitive medium.

The beam 12 is reflected from a mirror 18 to an astigmatic lens configuration 20. The configuration 20 focuses the beam 12 to a controlled energy distribution which is reflected from mirrors 22 and 24 to impinge upon one or more facets 28 of a scanning polygon 26.

In the preferred embodiment, the rotational axis of polygon 26 is orthogonal to the plane in which light beam 12 travels. The facets 28 of the polygon 26 are mirrored surfaces suitable for the reflection of any radiated flux impinging upon them. Alternatively, flying spot scanning could be provided by any other suitable device, such as mirrored piezoelectric crystals or planar reflecting mirrors which are driven in an oscillatory fashion.

At a distance from the leading illuminated facet of the polygon 26 is positioned an imaging lens 30. As shown, the lens 30 is located in the optical path between the polygon 26 and the medium 32. The lens 30 is of a diameter to cooperate with the respective reflected light beams throughout each scan to focus them to a spot in a focal plane proximate the surface of recording medium 32 after being reflected from a mirror 34.

The lens 30 may be designed to insure that it provides a linear relationship between the rotation of the polygon 26 and the deflection of the spot in the transverse direction at the recording medium 32. This linearization by optical means prevents barrel or pincushion-type distortion effects without the need for electrical compensation.

The aforementioned U.S. Pat. No. 3,946,150 discloses the preferred configuration for the lens 20 and 30 and the teachings of this patent necessary for the understanding of the present invention are incorporated herein by reference.

The polygon 26 is continuously driven preferably by a hysteresis synchronous motor 40 via drive shaft 42 and may be synchronized in rotation to a synchronization signal representative of the scan rate used to obtain the original input signal. In the case of the utilization of a xerographic drum as the recording medium, the rotation rate of the drum determines the spacing of the scan lines if the polygon rate is constant. It should be noted that a cylindrical lens 35 may be interposed between mirror 34 and recording medium 32 to compensate for misalignments of optical elements as set forth in the aforementioned patent.

In order to compensate for speed variations of the optical scanner 26 caused by the hunting characteristic of motor 40, a speed control system 44, described in more detail hereinafter, is provided to control motor 40. As scanner 26 is caused to rotate, the light beam 12 is caused to trace a scan line 46 on the surface of recording medium 32, starting at location 48 and ending at location 50. Photodetectors 52 and 53 are provided adjacent to the surface of recording medium 32 to generate a signal when light beam 12 reaches locations 48 and 50 a portion of light beam 12 being deflected to detectors 52 and 53 via mirrors 54 and 55, respectively (although not shown in the figure, amplifying the pulse shaping circuits normally follow each photodetector 52 and 53 to provide the appropriate driving signals to the counters shown in FIGS. 2-4). In other words, detectors 52 and 53 generate start of scan and end of scan signals which, due to the rotation of polygon 26, are in the form of a pulse train whose frequency is dependent on the speed of scanner polygon 26. Any variations of scanner speed due, for example, to the hunting characteristic of motor 40 can be detected and corrected as set forth hereinafter.

As disclosed in U.S. Pat. No. 3,950,146 medium 32 may be a xerographic drum (as shown) which rotates consecutively through a charging station, an exposure station where the beam from the rotating polygon 26 would traverse a scan line 46 on the drum, through a developing station, a transfer station where a web of copy paper is passed in contact with the drum and receives an electrostatic discharge to induce a transfer of the developed image from the drum to the copy paper. A fusing device can fix images to the copy paper.

Usable images are provided in that the information content of the scanning spot is represented by the modulated or variable intensity of light respective to its position within the scan line 46. As the spot traverses a charged surface through a given scan angle, the spot disipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained therein.

A synchronous motor 40 is driven by two signals in quadrative phase relationship. If the drive frequency is $f$ and the motor has n poles, then the shaft speed $S=2f/n$ rps. Operating in the synchronous mode, the long term average speed is as stable as the frequency source driving the motor. However, in the short term, disturbing torques may change shaft speeds. Therefore, controlling the frequency of the signal driving the motor will compensate for speed variations of the motor.

Figure 2:
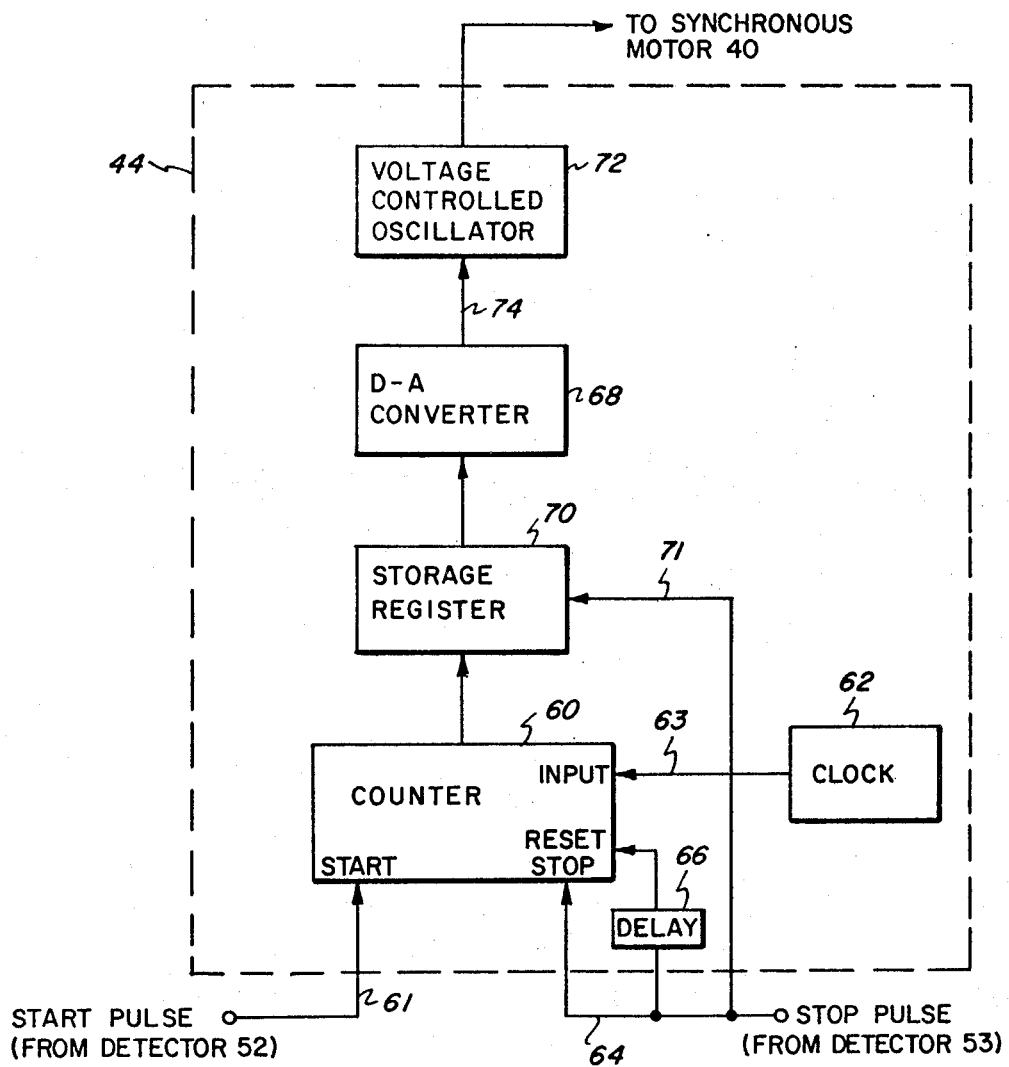
FIGS. 2-4 are block diagrams of various embodiments of the speed control system of the present invention.

Referring now to FIG. 2, a block diagram of one embodiment of speed control system 44 is illustrated. The start pulse when scan line 46 is initiated is generated by photodetector 52 is applied to the start, or enable, terminal of counter 60 via lead 61, counter 60 counting the pulses applied thereto from clock generator 62 on lead 63. The pulse generated by detector 53 when scan line 46 is completed is applied to the stop, or disable terminal of counter 60 via lead 64 and to a reset terminal of counter 60 via delay means 66. The output of counter 60 is applied to digital to analog converter 68 via storage register 70. The storage register 70 is required to remember the count reached by counter 60 until the next count occurs so that the analog signal remains present all the time whereby the analog voltage can be applied continuously to VCO 72. The stop pulse on lead 71 causes storage register 70 to acquire the binary count from counter 60 and remember it until the next stop pulse occurs. The output of converter 68 is applied to voltage controlled oscillator (VCO) 72 via lead 74, the output of the VCO being coupled to synchronous motor 40.

In operation, clock 62 is selected to generate pulses of a rate sufficient to provide counter 60 with enough pulses during a scan line period to enable the counter 60 to provide an indication of the speed of scanner 26 and to provide the correct voltage to VCO 72 so that the synchronous motor 40 drives polygon 26 at the proper nominal speed.

As the scanner 26 rotates, a laser beam is scanned across photodetectors 52 and 53 which may be coincident with the left or right margins of the page being formed on the drum. The initial pulse from detector 52 starts counter 60 which counts pulses from the accurate clock 62 until stopped by the initial pulse from detector 53. The resulting count is inversely proportional to the speed of motor 40. The count, which is in parallel digital form (although shown as a single output line) is converted to serial analog form by digital to analog converter 68 which is selected to provide an analog voltage having a magnitude directly proportional to the digital count from counter 60. The output from converter 68 controls VCO 72, the output frequency thereof being dependent on the magnitude of the input voltage on lead 74. VCO 72 is initially set to provide a nominal frequency at its output which corresponds to the desired speed of scanner 26. Therefore, if motor 40 slows down due to an increased load on the motor shaft which causes hunting, counter 60 will generate a larger number since the stop pulse from detector 53 will be generated later than if the motor was at the nominal speed. This larger count number will be converted by converter 68 to a voltage larger than the nominal voltage which in turn will increase the frequency (speed) of motor 40 towards the nominal frequency. When the motor speed is at the desired value, the count from counter 60 will be of a value which corresponds to the nominal motor speed (frequency).

If the speed of the motor 40 is greater than the nominal motor speed (due to motor shaft oscillations above the nominal speed) the output of counter 60 is such that the analog voltage to VCO 72 is reduced below the nominal value and the frequency output of VCO 72 is reduced in order to reduce the shaft speed of motor 40. The information relating to the speed deviations of motor 40 from the nominal speed (error information) is generated frequently since the motor speed and the number of scanner facets 28 provide a high number of scan lines per second, typically 5000. In other words, the circuitry provided in the FIG. 2 embodiment is selected to provide a correction signal to VCO 72 of 5000 per second which provides an accurate and rapid technique for correcting motor speed errors due to hunting.

A delay means 66 may be provided to allow the stop pulse generated by detector 53 to reset the counter 60 to be ready for the next scan line after the count has transferred from storage register 70 to converter 68.

Figure 3:
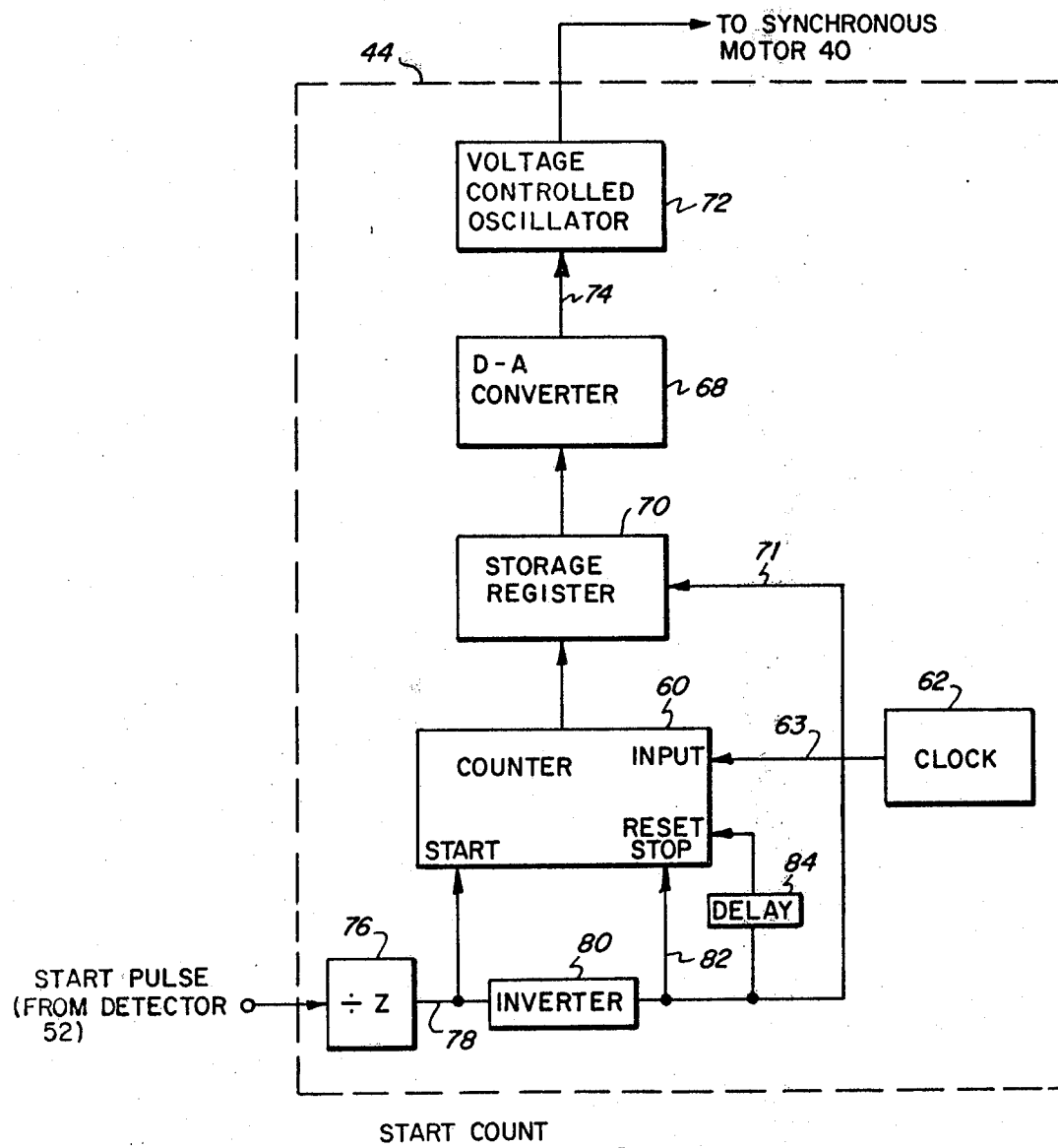
Figure 3:
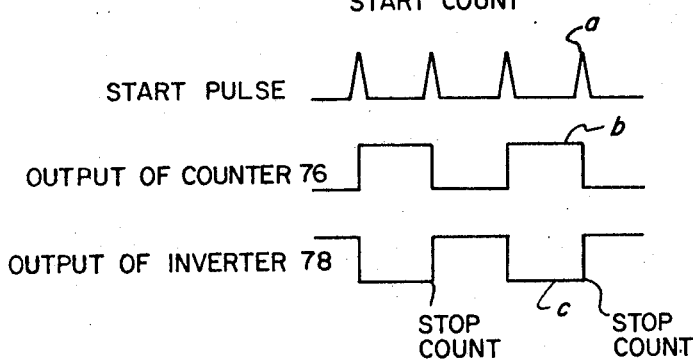

FIG. 3 shows an alternate embodiment wherein only the start pulse output of detector 52 controls counter 60. A simplified timing diagram is also shown to illustrate the operation of the FIG. 3 embodiment. This embodiment can be used if the scanner facets 28 are very accurately positioned relative to one another so that the count in counter 60 accurately reflects any speed variation in the motor 40. It should be noted at this point that elements similarly labeled in each figure perform similar functions. A divide by two counter 76 which can be a simple flip-flop provides a single pulse on lead 78 for every two pulses from detector 52, the leading edge of the pulse being initiated at the receipt of the first start pulse and the trailing edge of the pulse occurring at the end of the second start pulse (see timing waveforms a and b). The output of counter 76 is applied to inverter 80 which provides the intervening stop pulses to counter 60 via lead 82 at the termination of the pulse signal from counter 76 (see timing waveform c). The output from inverter 80 is also applied to delay means 84 and then to the reset terminal of counter 60 as shown and to storage register 70, the latter input causing the contents of counter 60 to be transferred to storage register 70 as described hereinabove. The operation of the embodiment shown in FIG. 3 is similar to that described with reference to FIG. 2 except that counter 60 generates a new count for every second facet of the polygon 26.

Figure 4:
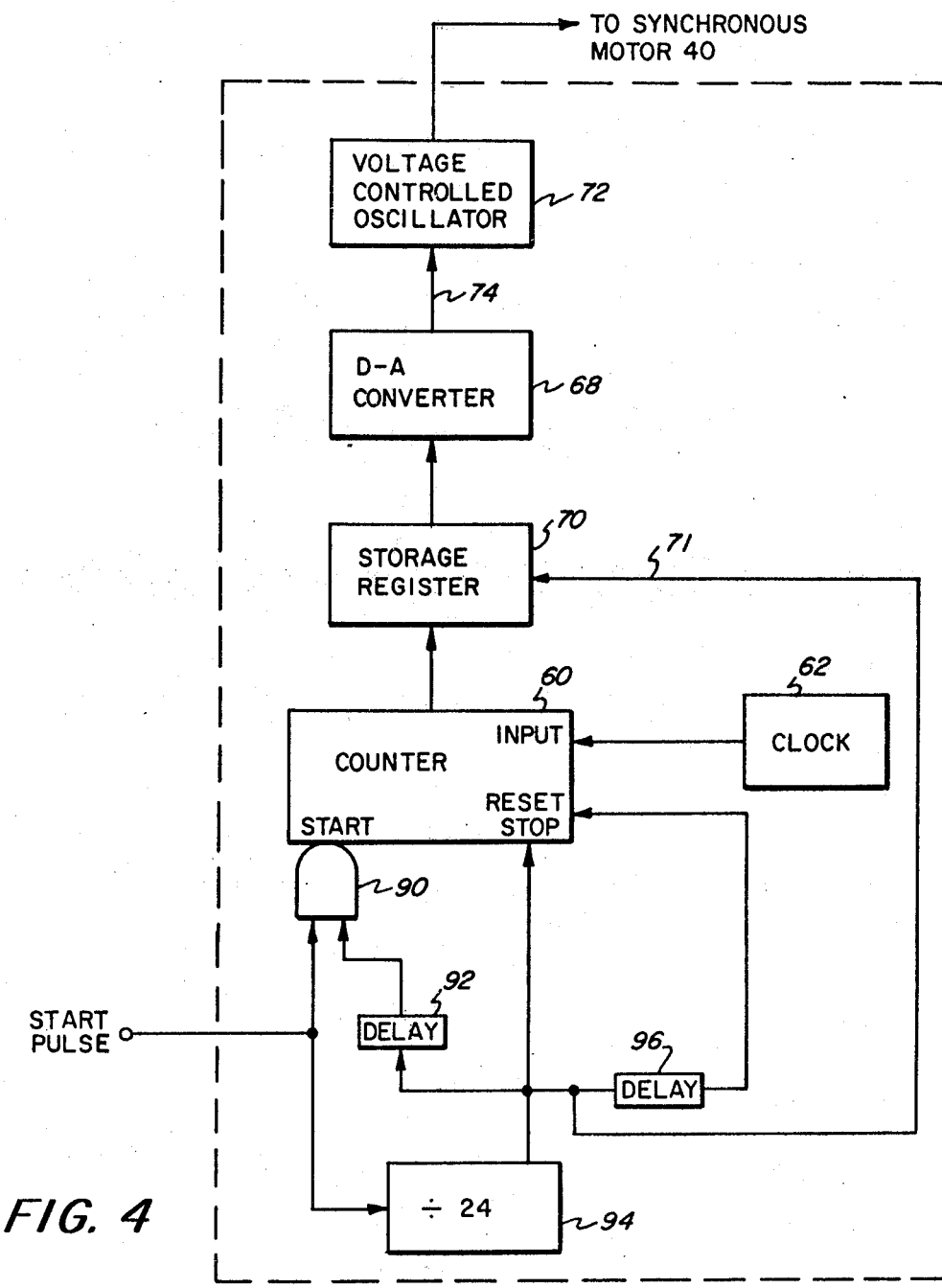
Figure 5:
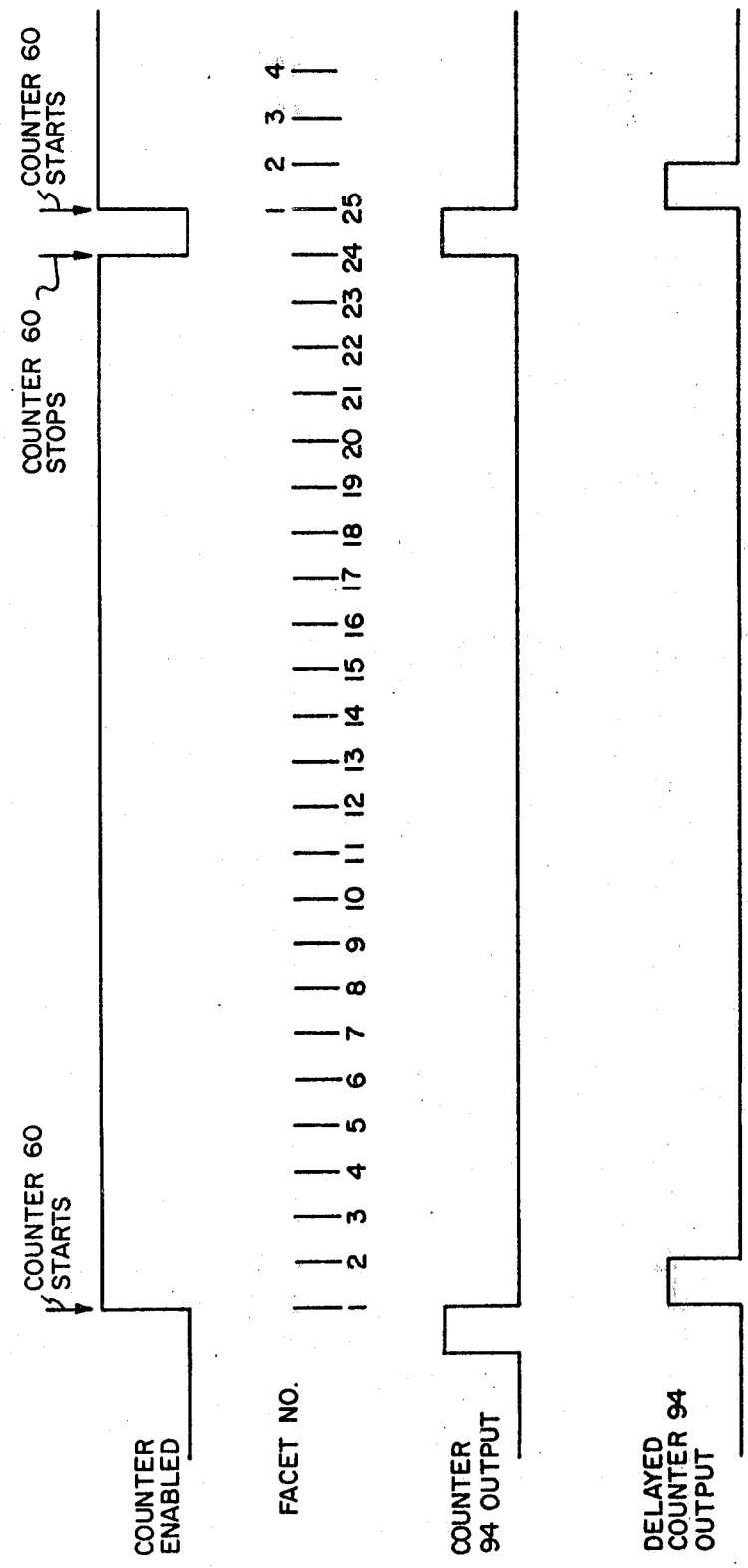
FIG. 5 is a simplified timing diagram for the embodiment shown in FIG. 4.

If the facet-to-facet errors are too large to utilize the FIG. 3 embodiment, the same scanner facet can be utilized to generate the start and stop pulses and therefore the correction signal is generated on every revolution of the polygon 26. Referring to FIG. 4 and assuming that the polygon has 24 facets, a start pulse is generated from the first available scanner facet and applied to counter 60 via AND gate 90. The start pulse is also applied to divide by 24 counter 94. The output of counter 94 which is initially logic "1" and changes to logic "0" when the first start pulse is applied to counter 94, is detected and coupled to the other input of AND gate 90 via delay 92. The counter 60 is thus started by the first start pulse detected but the next 23 pulses are ignored by the start input terminal of counter 60. Counter 94 is arranged to generate a stop pulse for each 24 start pulse counted, the rising edge of the stop pulse being generated when the 24th start pulse occurs, and the following edge being coincident with the 25th start pulse. Counter 94 may comprise the RCA CD4059 Standard "A" Series types from the RCA Corporation, a COS/MOS programmable counter. At the 24th start pulse, counter 94 applies the stop pulse to counter 60, the rising edge of this pulse causing counter 60 to stop counting. The stop pulse is used to both stop counter 60 and to reset the counter, the latter being accomplished by the rising edge of the pulse via delay 96. The stop pulse, via delay 92, enables AND gate 90 so that the 25th start pulse, which is from the same facet which generated the initial start pulse, is utilized to restart counter 62, the cycle thereafter being repeated. A timing diagram illustrating the operation of FIG. 4 is shown in FIG. 5. The embodiment shown in FIG. 4 is less satisfactory than the embodiments shown in FIGS. 2 and 3 since the error frequency is generated less frequently, requiring that the natural oscillation frequency of the motor and load be lower than the rotational frequency of the motor. This is normally the case when driving a large inertial load (such as a polygon) with a low-torque motor and therefore the FIG. 4 embodiment is well suited for use in the present invention.

While the invention has been described with reference to its preferred embodiment, it will be understood by those skilled in the art that various changes may be made and equivalents may be substituted for elements thereof not departing from the true spirit and scope of the invention. In addition, many modifications may be made to adapt a particular situation or material to the teaching of the invention without departing from its essential teachings.

What is claimed is:

1. In an apparatus having a motor driven rotating multifaceted polygon for scanning a beam of radiation across a medium in successive scans, a motor speed control system comprising:

scan signal means for generating a start of scan signal for each facet;

a counter having the capability of being started and stopped by signals applied thereto;

a clock coupled to said counter for supplying pulses to be counted thereby, said start of scan signal starting said counter;

means for stopping said counter, the number of counts in said stopped counter representating the speed of said multifaceted polygon, the output count being in digital format;

means for converting said digital format signal to an analog signal; and a voltage controlled oscillator having a nominal frequency output which corresponds to the desired polygon speed, the frequency of said voltage controlled oscillator being changed in response to said analog signal if the actual speed of said polygon is different than said nominal speed, and means for coupling the output of said voltage controlled oscillator to said motor.

2. The system as defined in claim 1 wherein said scan signal means comprises a photodetector positioned to receive said radiation at the beginning of each scan across said medium.

3. The system as defined in claim 1 wherein said stop means comprises means responsive to said start of scan signal for stopping the counter.

4. The system as defined in claim 3 further including means for enabling said counter to generate a count for every second facet of said multifaceted polygon.

5. The system as defined in claim 4, wherein said means for stopping said counter includes an inverter coupled between said scan signal means for receiving said start of scan signal and a stop input of said counter, and wherein said means for enabling said counter includes a divide-by-two circuit coupled between said scan signal means and said inverter, the output of said divide-by-two circuit being connected to a start input of said counter.

6. The system as defined in claim 3 further including means for enabling said counter to generate a count for every revolution of said multifaceted polygon.

7. The system as defined in claim 6, wherein said means for stopping said counter includes a circuit coupled to said start of scan means and capable of dividing said start of scan signal by an integer equal to the number of facets on said polygon.

8. The system as defined in claim 7, wherein said means for enabling includes an AND-gate having a first input connected to said scan signal means for receiving said start of scan signal and a second input coupled to the output of said circuit.

9. The system as defined in claim 8, wherein said means for enabling further includes delay means coupled between the output of said circuit and the second input of said AND-gate.

10. The system as defined in claim 3, wherein said means for stopping said counter includes an inverter coupled between said scan signal means for receiving said start of scan signal and a stop input of said counter.

* * * * *